(12) United States Patent
Yanagida et al.

(10) Patent No.: US 7,618,910 B2
(45) Date of Patent: Nov. 17, 2009

(54) DIELECTRIC CERAMIC COMPOSITION PRODUCTION METHOD

(75) Inventors: Miyuki Yanagida, Narita (JP); Akira Sato, Inba-gun (JP)

(73) Assignee: TDK Corporation, Tokyo (JP)

( * ) Notice: Subject to any disclaimer, the term of this patent is extended or adjusted under 35 U.S.C. 154(b) by 136 days.

(21) Appl. No.: 11/723,304

(22) Filed: Mar. 19, 2007

(65) Prior Publication Data

US 2007/0225154 A1    Sep. 27, 2007

(30) Foreign Application Priority Data

Mar. 23, 2006    (JP)    .............................. 2006-081424

(51) Int. Cl.
*C04B 35/468*    (2006.01)
(52) U.S. Cl. ...................................... 501/139
(58) Field of Classification Search ................. 501/139
See application file for complete search history.

(56) References Cited

U.S. PATENT DOCUMENTS

| | | | |
|---|---|---|---|
| 6,346,497 B1 | 2/2002 | Nakamura et al. | |
| 6,544,916 B1 * | 4/2003 | Sato et al. | 501/137 |
| 6,809,052 B2 * | 10/2004 | Horie et al. | 501/138 |
| 7,399,724 B2 * | 7/2008 | Yanagida et al. | 501/139 |
| 2007/0191211 A1 * | 8/2007 | Hosono et al. | 501/139 |
| 2007/0225154 A1 * | 9/2007 | Yanagida et al. | 501/139 |
| 2007/0284792 A1 * | 12/2007 | Yanagida et al. | 264/614 |
| 2007/0287625 A1 * | 12/2007 | Yanagida et al. | 501/138 |

FOREIGN PATENT DOCUMENTS

| | | |
|---|---|---|
| JP | A 08-124785 | 5/1996 |
| JP | A 2000-281341 | 10/2000 |
| JP | A 2000-348961 | 12/2000 |
| JP | A 2003-176180 | 6/2003 |
| JP | A 2005-029423 | 2/2005 |
| JP | A 2006-169004 | 6/2006 |
| JP | A 2006-169005 | 6/2006 |
| JP | A 2006-169006 | 6/2006 |
| KR | 2000-0023492 | 4/2000 |

* cited by examiner

*Primary Examiner*—Karl E Group
(74) *Attorney, Agent, or Firm*—Oliff & Berridge, PLC

(57) ABSTRACT

A production method of a dielectric ceramic composition, comprising a main component comprised of barium titanate, a fourth subcomponent comprised of an oxide of R1 (note that R1 is at least one kind selected from a first element group composed of rare earth elements having a value of effective ionic radius for coordination number 9 of less than 108 pm) and a fifth sub component comprised of an oxide of R2 (note that R2 is at least one kind selected from a second element group composed of rare earth elements having a value of effective ionic radius for coordination number 9 of 108 pm to 113 pm); comprising the steps of obtaining a post-reaction material by bringing the main component material reacting with a part of the fourth subcomponent material and/or a part of the fifth subcomponent material, and adding remaining materials of the fourth subcomponent and the fifth subcomponent to be included in the dielectric ceramic composition to the post-reaction material; wherein a ratio M1/M2 of the number of moles M1 of R1 of the fourth subcomponent and the number of moles M2 of R2 of the fifth subcomponent in the finally obtained dielectric ceramic composition satisfies $4<M1/M2\leqq100$: by which specific permittivity and temperature characteristic of capacitance can be balanced even when the dielectric layers are made thin.

7 Claims, 1 Drawing Sheet

DIELECTRIC CERAMIC COMPOSITION PRODUCTION METHOD

BACKGROUND OF THE INVENTION

1. Field of the Invention

The present invention relates to a dielectric ceramic composition used as a dielectric layer of an electronic device, such as a multilayer ceramic capacitor, a production method thereof and an electronic device comprised of the dielectric ceramic composition as a dielectric layer.

2. Description of the Related Art

A multilayer ceramic capacitor as an example of electronic devices is produced, for example, by printing internal electrodes in a predetermined pattern on a ceramic green sheet formed by a predetermined dielectric ceramic composition, alternately stacking the results to form as one body, and co-firing a thus obtained green chip. Since internal electrode layers of the multilayer ceramic capacitor are formed to be one body with ceramic dielectric by firing, materials not reacting with the ceramic dielectric has to be selected. Therefore, in the related art, it has been necessary to use expensive precious metals, such as platinum and palladium, as the material composing the internal electrode layer.

In recent years, however, dielectric ceramic compositions using inexpensive base metals, such as nickel and copper, have been developed and a drastic reduction of costs has been realized.

Also, in recent years, demands for downsizing of electronic devices have become stronger along with electronic circuits becoming higher in density, and multilayer ceramic capacitors have rapidly become downsized with a larger capacity. To attain a downsized multilayer ceramic capacitor with a larger capacity, a method of making dielectric layers thinner and a method of heightening specific permittivity of a dielectric ceramic composition included in dielectric layers, etc. have been generally used. However, when dielectric layers are made thin, an electric field imposed on the dielectric layers becomes stronger at the time of applying a direct current voltage, consequently, there has been a disadvantage that a change of the specific permittivity with time, that is, a change of the capacity with time becomes remarkably large.

To improve a change of the capacity with time under a direct current electric field, there has been proposed a method of using dielectric particles having a small average crystal grain diameter as dielectric particles to be included in the dielectric layers (for example, refer to the Japanese Unexamined Patent Publication No. H08-124785). The Japanese Unexamined Patent Publication No. H08-124785 discloses a dielectric ceramic composition having a specific composition, wherein an average crystal grain diameter of the dielectric particles is 0.45 µm or smaller. However, the dielectric ceramic composition described in the article has too low specific permittivity to respond to downsizing and obtaining of a larger capacity.

Also, the present inventors have disclosed an electronic device in the Japanese Unexamined Patent Publication No. 2005-29423, such as a multilayer ceramic capacitor, having improved specific permittivity and accelerated lifetime of insulation resistance (IR) by dividing rare earth elements to two groups based on a value of effective ionic radius for coordination number 9, setting an adding quantity of elements belonging to one group and an adding quantity of elements belonging to the other group to be in a specific range, and setting a ratio of the adding quantities to be in a specific range.

However, along with rapid downsizing of electronic devices, multilayer ceramic capacitors are also required to be furthermore downsized and to have a larger capacity. As explained above, as a method of downsizing a multilayer ceramic capacitor and increasing the capacity, a method of making the dielectric layers thinner and a method of improving the specific permittivity are used. When making the dielectric layers thinner, a change of specific permittivity with time and other characteristics (a temperature characteristic of capacitance and IR accelerated lifetime, etc.) are required to be equivalent to those before making the layers thinner or even improved. Accordingly, to attain downsizing of a multilayer ceramic capacitor and to increase the capacity, the dielectric layers are required to be thinner while maintaining various characteristics (a change of specific permittivity with time, a temperature characteristic of capacitance and an IR accelerated lifetime, etc.) and to improve the specific permittivity. However, in specific examples of the Japanese Unexamined Patent Publication No. 2005-29423, a thickness of one dielectric layer is 3.5 µm, but when the layer is furthermore made thinner (for example, 1.5 µm), there have been cases where the specific permittivity declined and a temperature characteristic of the capacitance declined. Therefore, even when the dielectric layers are made furthermore thinner, it has been required to improve the specific permittivity while maintaining a temperature characteristic of the capacitance, IR accelerated lifetime and other characteristics preferable.

SUMMARY OF THE INVENTION

An object of the present invention is to provide a dielectric ceramic composition capable of exhibiting high specific permittivity, a preferable temperature characteristic of the capacitance and of improving reliability and the production method even when the dielectric layers are made thinner. Another object of the present invention is to provide an electronic device, such as a multilayer ceramic capacitor, having a dielectric layer composed of a dielectric ceramic composition as such.

The present inventors have found that when the dielectric layers are made thinner a high specific permittivity and preferable temperature characteristic of the capacitance could be realized and, furthermore, the IR accelerated lifetime and other characteristics could be improved by dividing rare earth elements to two groups based on a value of effective ionic radius for coordination number 9 and by using a specific method of adding oxides of elements selected from one or both of the two groups. Also, the present inventors have found that the above effects could be furthermore enhanced by setting a ratio of the number of moles of elements belonging to one group and the number of moles of elements belonging to the other group in the two groups to be in a specific range in the finally obtained dielectric ceramic composition, and completed the present invention.

According to the present invention, there is provided a production method of a dielectric ceramic composition, comprising a main component comprised of barium titanate, a fourth subcomponent comprised of an oxide of R1 (note that R1 is at least one kind selected from a first element group composed of rare earth elements having a value of effective ionic radius for coordination number 9 of less than 108 pm), and a fifth subcomponent comprised of an oxide of R2 (note that R2 is at least one kind selected from a second element group composed of rare earth elements having a value of effective ionic radius for coordination number 9 of 108 pm to 113 pm);

comprising the steps of obtaining a post-reaction material by bringing a material of said main component reacting with a part of a material of said fourth subcomponent and/or a part of a material of said fifth subcomponent to be included in said dielectric ceramic composition in advance, and adding remaining materials of said fourth subcomponent and said fifth subcomponent to be included in said dielectric ceramic composition to said post-reaction material;

wherein a ratio M1/M2 of the number of moles M1 of R1 of said fourth subcomponent to the number of moles M2 of R2 of said fifth subcomponent in said finally obtained dielectric ceramic composition satisfies 4<M1/M2≦100.

In the present invention, rare earth metals are divided to R1 and R2 based on a value of effective ionic radius for coordination number 9, a subcomponent comprised of an oxide of R1 is the fourth subcomponent and a subcomponent comprised of an oxide of R2 is the fifth subcomponent. By bringing a material of the main component reacting with a part of a material of the fourth subcomponent and/or a part of a material of the fifth subcomponent in advance, a post-reaction material, wherein at least the fourth subcomponent and/or the fifth subcomponent exist inside of particles of the main component, can be obtained.

Note that, in the present invention, it is sufficient if at least the fourth subcomponent and/or the fifth subcomponent exist inside of particles of the main component in the obtained post-reaction material. Namely, for example, the fourth subcomponent and/or the fifth subcomponent may be segregated or uniformly included inside of particles of the main component, alternately, the content ratio may gradually changes therein.

Then, remaining of the fourth subcomponent and the fifth subcomponent to be included in a dielectric ceramic composition is added to the obtained post-reaction material, and a ratio (M1/M2) of the number of moles M1 of R1 of the fourth subcomponent to the number of moles M2 of R2 of the fifth subcomponent in the finally obtained dielectric ceramic composition is set to be in the above range.

As a result, the specific permittivity can be improved and a temperature characteristic of the capacitance can become preferable, consequently, reliability can be improved even when the dielectric layers are made thinner.

In the present invention, preferably, the material of said main component and a part of the material of said fourth subcomponent and/or a part of the material of said fifth subcomponent to be included in said dielectric ceramic composition are dispersed as solid solution in advance. As a result, the fourth subcomponent and/or the fifth subcomponent can be uniformly dispersed in the main component as solid solution, and the characteristics can be furthermore improved.

In the present invention, the word "reaction" is used based on a concept of including solid dispersion and coating, etc. and includes a method for creating a state where the fourth subcomponent and/or the fifth subcomponent exists inside the main component.

In the present invention, a content of the fourth subcomponent in the finally obtained dielectric ceramic composition with respect to 100 moles of the main component is preferably 0 to 10 moles (note that 0 is not included) when calculated as a conversion of R1. The lower limit of the content of the fourth subcomponent is, more preferably, 0.1 mole or larger and, furthermore preferably, 0.2 mole or larger when calculated as a conversion of R1. The upper limited of the content of the fourth subcomponent is, more preferably, 6 moles or smaller and, furthermore preferably, 5 moles or smaller when calculated as a conversion of R1.

Also, a content of the fifth subcomponent in the finally obtained dielectric ceramic composition with respect to 100 moles of the main component is preferably 0 to 2 moles (note that 0 is not included) and, more preferably, 0 to 1 mole (note that 0 is not included) when calculated as a conversion of R2.

In the present invention, by setting contents of the fourth subcomponent and fifth subcomponent to be included in the finally obtained dielectric ceramic composition to be in the above range, it is possible to strike a balance between the specific permittivity and a temperature characteristics of the capacitance, furthermore, the IR accelerated lifetime can become preferable. When a content of the fourth subcomponent is too small, the effect of improving the temperature characteristic of the capacitance cannot be obtained, while when too large, the sinterability tends to decline. Also, when a content of the fifth subcomponent is too small, the effects of improving the IR and IR accelerated lifetime cannot be obtained, while when too large, the temperature characteristic of the capacitance tends to decline.

In the present invention, the fourth subcomponent and/or the fifth subcomponent to be brought to react with a material of the main component in advance is preferably 0 to 0.5 mole (note that 0 and 0.5 are not included) and, more preferably, 0 to 0.4 mole (note that 0 is not included) when calculated as a conversion of R1 and/or R2 with respect to 100 moles of the main component.

When quantities of materials of the fourth subcomponent and/or the fifth subcomponent to be brought to react with the main component material is too large, a crystal grain diameter of a sintered body to be obtained after firing becomes too large, so that the temperature characteristic of the capacitance tends to decline and the IR accelerated lifetime tends to decline.

In the present invention, when assuming that a value of effective ionic radius for coordination number 9 of rare earth elements composing the first element group is r1 and a value of effective ionic radius for coordination number 9 of rare earth elements composing the second element group is r2, it is preferable that the first element group and the second element group are composed so that a ratio (r2/r1) of r1 and r2 satisfies a relationship of 1.007<r2/r1<1.06.

In the present invention, preferably, the R1 is at least one kind selected from Y, Ho, Er, Tm, Yb and Lu.

In the present invention, preferably, the R2 is at least one kind selected from Dy, Th, Gd and Eu.

By setting a ratio of effective ionic radius for coordination number 9 of R1 and R2 to be in the above range and by attaining the above compositions of the R1 and R2, the effects of the present invention can be furthermore enhanced.

Note that a value of effective ionic radius mentioned in the present specification is a value based on the article "R. D. Shannon, Acta Crystallogr., A32, 751 (1976)".

In the present invention, preferably, the dielectric ceramic composition furthermore comprises a first subcomponent comprised of at least one kind selected from MgO, CaO, BaO and SrO, a second subcomponent comprised of $SiO_2$ mainly and comprised of at least one kind selected from MO (note that M is at least one kind selected from Mg, Ca, Ba and Sr), $Li_2O$ and $B_2O_3$, and a third subcomponent comprised of at least one kind selected from $V_2O_5$, $MoO_3$ and $WO_3$;

wherein ratios of respective subcomponents with respect to 100 moles of the main components are first subcomponent: 0.1 to 5 moles, second subcomponent: 0.1 to 12 moles, and third subcomponent: 0 to 0.3 mole (note that 0 is not included).

In the present invention, preferably, the dielectric ceramic composition furthermore comprises a sixth subcomponent comprised of MnO and/or $Cr_2O_3$, and a ratio of the sixth subcomponent with respect to 100 moles of the main component is 0.05 to 1.0 mole.

In the present invention, as a result that the first to third subcomponents (more preferably, furthermore the sixth subcomponent) are included together with the fourth subcomponent and the fifth subcomponent, a temperature characteristic of the capacitance can be improved and, particularly, the X7R characteristics of the EIA standard (−55 to 125° C., ΔC=within ±15%) can be satisfied. Note that timing of adding the first to third and sixth subcomponents is not particularly limited, but it is preferable that the first to third and sixth subcomponents are added to the post-reaction material after bringing the main component material react with a part of the fourth subcomponent material and/or a part of the fifth subcomponent material in advance.

In the present invention, preferably, a material having an average particle diameter of 0.05 to 0.5 μm and, more preferably, 0.1 to 0.4 μm is used as a material of the main component. By using a main component material having an average particle diameter in the above range, an average crystal grain diameter of dielectric particles after sintering can preferably become fine as 0.1 to 0.3 μm, so that a change of the specific permittivity with time can become small.

A dielectric ceramic composition according to the present invention is produced by any one of the methods explained above.

An electronic device according to the present invention has a dielectric layer composed of the dielectric ceramic composition explained above. The electronic device is not particularly limited and multilayer ceramic capacitors, piezoelectric elements, chip inductors, chip varisters, chip thermisters, chip resistors and other surface mounted (SMD) chip type electronic devices may be mentioned.

According to the present invention, rare earth elements are divided to R1 and R2 based on a value of effective ionic radius for coordination number 9, a subcomponent comprised of an oxide of R1 is a fourth subcomponent and a subcomponent comprised of an oxide of R2 is a fifth subcomponent. Then, a material of the main component is brought to react with a part of a material of the fourth subcomponent and/or a part of a material of the fifth subcomponent in advance. After that, remaining of the fourth subcomponent and the fifth subcomponent are added to the post-reaction material, and a ratio (M1/M2) of the number of moles M1 of R1 of the fourth subcomponent to the number of moles M2 of R2 of the fifth subcomponent in the finally obtained dielectric ceramic composition is set to be in the above range. As a result, it is possible to provide a dielectric ceramic composition capable of striking a balance between high specific permittivity and a preferable temperature characteristic of the capacitance and having preferable other characteristics (a dielectric loss, CR product, IR and IR accelerated lifetime) and the production method.

BRIEF DESCRIPTION OF DRAWINGS

Below, the present invention will be explained based on an embodiment shown in a drawing.

DESCRIPTION OF THE PREFERRED EMBODIMENT

Multilayer Ceramic Capacitor 1

Figure 1:
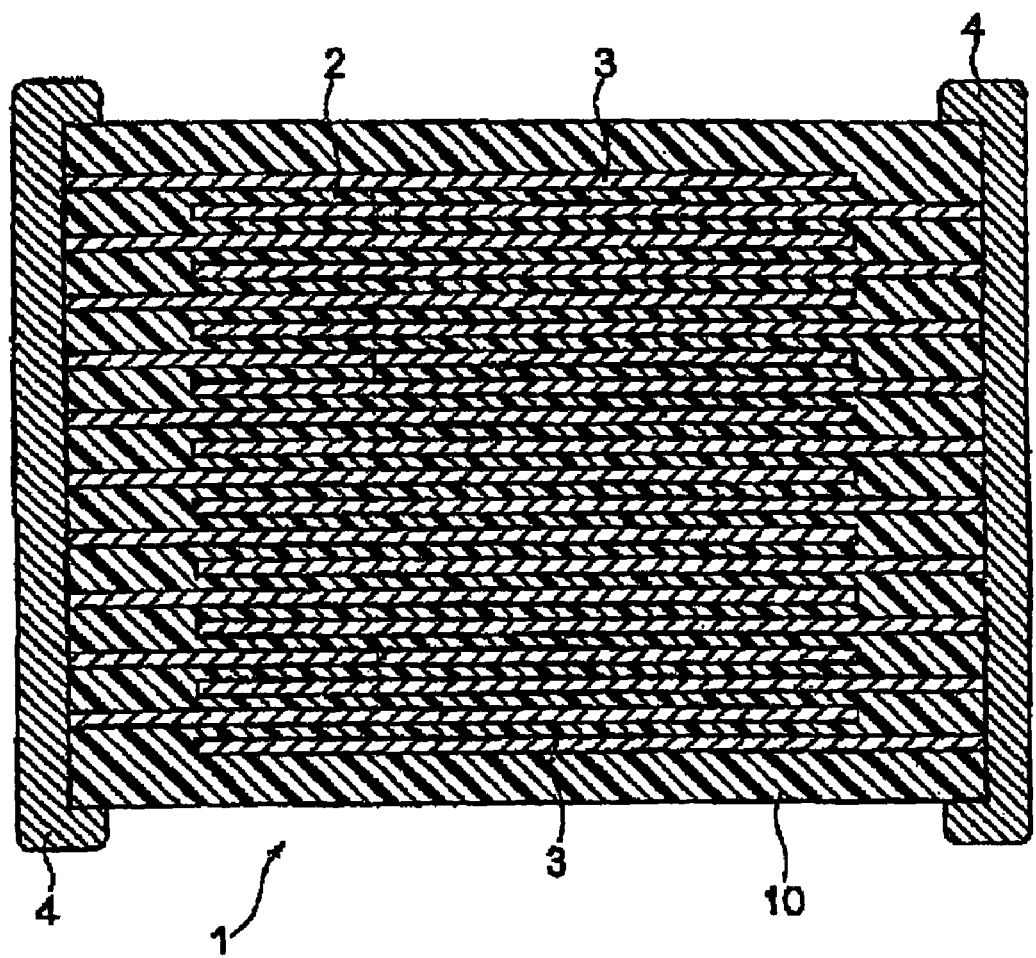
FIG. 1 is a sectional view of a multilayer ceramic capacitor according to an embodiment of the present invention.

As shown in FIG. 1, a multilayer ceramic capacitor 1 according to an embodiment of the present invention has a capacitor element body 10 configured by alternately stacking dielectric layers 2 and internal electrode layers 3. On both end portions of the capacitor element body 10, a pair of external electrodes 4 respectively conducting to the internal electrode layers 3 alternately arranged inside the element body 10 are formed. A shape of the capacitor element body 10 is not particularly limited but is normally a rectangular parallelepiped shape. Also, a size thereof is not particularly limited and may be suitably determined in accordance with the use object.

The internal electrode layers 3 are stacked, so that respective end surfaces thereof are exposed to surfaces of two facing end portions of the capacitor element body 10. The pair of external electrodes 4 are formed on both end portions of the capacitor element body 10 and connected to the exposed end surfaces of the alternately arranged internal electrode layers 3 so as to configure a capacitor circuit.

Dielectric Layer 2

The dielectric layers 2 include a dielectric ceramic composition explained below.

In the present embodiment, the dielectric ceramic composition includes a main component comprised of barium titanate expressed by a composition formula $Ba_mTiO_{2+m}$, wherein "m" satisfies $0.990<m<1.010$ and a ratio of Ba and Ti satisfies $0.990<Ba/Ti<1.010$, a fourth subcomponent comprised of an oxide of R1 (note that R1 is at least one kind selected from a first element group composed of rare earth elements having a value of effective ionic radius for coordination number 9 of less than 108 pm), a fifth subcomponent comprised of an oxide of R2 (note that R2 is at least one kind selected from a second element group composed of rare earth elements having a value of effective ionic radius for coordination number 9 of 108 to 113 pm) and other subcomponents.

The fourth subcomponent is a subcomponent comprised of an oxide of R1. R1 is at least one kind selected from the first element group. The first element group includes Y (107.5 pm), Ho (107.2 pm), Er (106.2 pm), Tm (105.2 pm), Yb (104.2 pm) and Lu (103.2 pm). Among them, Y, Yb and Er are preferable and Y and Yb are more preferable.

The fourth subcomponent has an effect of flattening a temperature characteristic of capacitance. A content of the fourth subcomponent is preferably 0 to 10 moles (note that 0 is not included) when calculated in conversion of R1. The lower limit value of the content is preferably 0.1 mole or larger and, more preferably, 0.2 mole or larger when calculated in conversion of R1. Also, the upper limit value of the content is preferably 6 moles or smaller and, more preferably, 5 mole or smaller when calculated in conversion of R1. When the content is too small, the effect of adding the fourth subcomponent cannot be obtained and a temperature characteristic of the capacitance declines. While, when the content is too large, the sinterability tends to decline.

The fifth subcomponent is a subcomponent comprised of an oxide of R2. R2 is at least one kind selected form the second element group. The second element group includes Dy (108.3 pm), Tb (109.5 pm), Gd (110.7 pm) and Eu (112 pm). Among them, Tb, Gd and Eu are preferable, and Tb and Gd are more preferable.

The fifth subcomponent exhibits an effect of improving IR and an IR accelerated lifetime. A content of the fifth subcomponent is preferably 0 to 2 moles (note that 0 is not included) and, more preferably, 0 to 1 mole (note that 0 is not included) and, furthermore preferably, 0 to 0.5 mole (note that 0 is not included) when calculated in conversion of R2. When the content is too small, the effect of improving the IR and IR accelerated lifetime cannot be obtained, while when too large, a temperature characteristic of the capacitance tends to decline. Note that, as will be explained later on, a production method of the present embodiment has a step for bringing a part of the fourth subcomponent material and/or a part of the fifth subcomponent material reacting with a main component material.

In the present embodiment, a ratio (M1/N2) of the number of moles M1 of R1 of the fourth subcomponent to the number of moles M2 of R2 of the fifth subcomponent is $4<M1/M2\leq100$ and, more preferably, $4<M1/M2\leq80$ and, furthermore preferably, $4<M1/M2\leq40$.

In the present embodiment, when assuming that a value of effective ionic radius for coordination number 9 of rare earth elements composing the first element group is r1, and that of the rare earth elements composing the second element group is r2, the first element group and the second element group are preferably composed so that a ratio (r2/r1) of r1 and r2 satisfies a relationship of 1.007<r2/r1<1.06. For example, a combination of Y (R1) and Gd (R2) may be mentioned as a preferable combination.

In the present embodiment, as other subcomponent than the fourth subcomponent comprised of an oxide of the R1 and the fifth subcomponent comprised of an oxide of the R2, it is preferable that the first to third and sixth subcomponents below are furthermore included.

Namely, it is preferable to furthermore include a first subcomponent comprised of at least one kind selected from MgO, CaO, BaO and SrO, a second subcomponent comprised of $SiO_2$ mainly and comprised of at least one kind selected from MO (note that M is at least one kind selected from Mg, Ca, Ba and Sr), $Li_2O$ and $B_2O_3$, a third subcomponent comprised of at least one kind selected from $V_2O_5$, $MoO_3$ and $WO_3$, and a sixth subcomponent comprised of MnO and/or $Cr_2O_3$.

Ratios of the above respective subcomponents with respect to 100 moles of the main component are, when calculated as a conversion of each oxide, the first subcomponent: 0.1 to 5 moles,
the second subcomponent: 0.1 to 12 moles,
the third subcomponent: 0 to 0.3 mole (note that 0 is not included), and
the sixth subcomponent: 0.05 to 1.0 mole; and more preferably,
the first subcomponent: 0.2 to 4 moles,
the second subcomponent: 0.5 to 6 moles,
the third subcomponent: 0 to 0.25 mole (note that 0 is not included), and
the sixth subcomponent: 0.05 to 0.4 mole.

In the present embodiment, as a result that the first to third and sixth subcomponents are included in the dielectric ceramic composition in addition to the fourth subcomponent comprised of the oxide of R1 and the fifth subcomponent comprised of an oxide of R2, a temperature characteristic of the capacitance can be improved and, preferably, the X7R characteristics (−55 to 125° C. and ΔC=within ±15%) of the EIA standard can be satisfied.

Note that, in the present specification, oxides composing the main component and subcomponents are expressed by a stoichiometric composition, but an oxidization state of each of the oxides may be deviated from the stoichiometric composition. Note that the above ratios of the respective subcomponents are obtained by calculating as a conversion of oxides of the stoichiometric composition based on metal amounts included in the oxides composing the respective subcomponents.

The reasons of limiting contents of the respective subcomponents are as below.

When a content of the first subcomponent (MgO, CaO, BaO and SrO) is too small, a temperature change rate of the capacitance becomes large. On the other hand, when the content is too much, it is liable that the sinterability declines and the IR accelerated lifetime deteriorates. Note that component ratios of respective oxides in the first subcomponent may be any.

The second subcomponent includes $SiO_2$ as the main component and at least one kind selected from MO (note that M is at least one kind selected from Mg, Ca, Ba and Sr), $Li_2O$ and $B_2O_3$. The second subcomponent mainly acts as a sintering aid. The first subcomponent also includes MO (note that M is at least one kind selected from Mg, Ca, Ba and Sr), but when MO is made to be a composite oxide with $SiO_2$ and to be a compound expressed by a composition formula $M_xSiO_{2+x}$, the melting point can be lowered. Since the melting point can be lowered, reactivity with the main component can be improved. Note that when using BaO and CaO as the MO, the composite oxide is preferably a compound expressed by a composition formula of $(Ba, Ca)_xSiO_{2+x}$. The "x" in the composition formula of $(Ba, Ca)_xSiO_{2+1}$ is preferably 0.8 to 1.2, and more preferably 0.9 to 1.1. When the "x" is too small, that is, when the content of $SiO_2$ is too much, it reacts with the main component $Ba_mTiO_{2+m}$ to deteriorate the dielectric characteristic. On the other hand, when the "x" is too large, the melting point becomes high to deteriorate the sinterability, which is unfavorable.

The third subcomponent ($V_2O_5$, $MoO_3$ and $WO_3$) exhibits an effect of flattening a temperature characteristic of the capacitance at the Curie's temperature or higher and an effect of improving the IR accelerated lifetime. When a content of the third subcomponent is too small, the effects become insufficient. On the other hand, when the content is too large, the IR declines remarkably. Note that component ratios of respective oxides in the third subcomponent may be any.

The sixth subcomponent (MnO and $Cr_2O_3$) has effects of shifting the Curie's temperature to the high temperature side, flattening a temperature characteristic of the capacitance, improving the insulation resistance (IR), improving the breakdown voltage and lowering the firing temperature, etc.

An average crystal grain diameter of dielectric particles included in the dielectric ceramic composition is not particularly limited, but 0.1 to 0.3 μm is preferable. When the average crystal grain diameter is too small, the specific permittivity tends to become low, while when too large, a change of specific permittivity with time tends to become large. An average crystal grain diameter of the dielectric particles can be measured by the code method for measuring an average particle diameter, for example, from a SEM image of the dielectric particles on an assumption that shapes of the dielectric particles are sphere.

A thickness of the dielectric layers 2 is not particularly limited, but 10 μm or thinner per one layer is preferable, 6 μm or thinner is more preferable, and 4.5 μm or thinner is furthermore preferable. A lower limit of the thickness is not particularly limited and is, for example, 0.5 μm or so.

The number of stacked layers of the dielectric layers 2 is not particularly limited, but 20 or larger is preferable, 50 or larger is more preferable, and 100 or larger is particularly preferable. An upper limit of the number of stacked layers is not particularly limited and is, for example, 2000 or so.

Internal Electrode Layer 3

A conductive material included in the internal electrode layers 3 is not particularly limited, but since components of the dielectric layers 2 has reduction-resistance, relatively inexpensive base metals may be used. As base metals to be used as the conductive material, Ni or a Ni alloy is preferable. As a Ni alloy, alloys of one or more kinds of elements selected from Mn, Cr, Co and Al with Ni are preferable, and a Ni content in the alloy is preferably 95 wt % or larger. Note that Ni or a Ni alloy may include a variety of trace components, such as P, in an amount of not larger than 0.1 wt % or so. A thickness of the internal electrode layers 3 may be suitably determined in accordance with the use object, etc., but normally it is 0.1 to 3 μm, and particularly 0.2 to 2.0 μm or so is preferable.

External Electrode 4

A conductive material to be included in the external electrodes 4 is not particularly limited and inexpensive Ni, Cu and alloys of these may be used in the present invention. A thickness of the external electrodes 4 may be suitably determined in accordance with the use object, etc. but normally 10 to 50 μm or so is preferable.

Production Method of Multilayer Ceramic Capacitor

A multilayer ceramic capacitor of the present embodiment is produced by producing a green chip by a normal printing method or a sheet method using paste, firing the result, printing or transferring external electrodes and firing in the same way as in the multilayer ceramic capacitor in the related arts. Below, the production method will be explained specifically.

First, a dielectric ceramic composition powder included in the dielectric layer paste is fabricated.

In the present embodiment, the dielectric ceramic composition powder is fabricated as below. First, a material of the main component and a part of a material of the fourth subcomponent and/or a part of a material of the fifth subcomponent (a material corresponding to a part of the fourth subcomponent and fifth subcomponent to be included in the dielectric ceramic composition) are brought to react or preferably dispersed as solid solution in advance, so that a post-reaction material is obtained (a pre-adding step of the subcomponent). Next, the post-reaction material is added with the remaining fourth subcomponent material and fifth subcomponent material (remaining material in the fourth subcomponent and fifth subcomponent for composing the dielectric ceramic composition) and the above first to third and sixth subcomponent materials (a post-adding step of the subcomponent). Then, preliminarily firing is performed if necessary, and a dielectric ceramic composition powder is fabricated.

As the above main component material, a $Ba_mTiO_{2+m}$ powder or a compound powder to be $Ba_mTiO_{2+m}$ when fired may be used, and an average particle diameter of the main component material is preferably 0.05 to 0.5 μm and, more preferably, 0.1 to 0.4 μm. When an average particle diameter of the main component material is too large, an average crystal grain diameter of dielectric particles after sintering becomes too large and it is liable that the temperature characteristic is deteriorated and the insulation resistance (IR) declines. While, when the average particle diameter is too small, dispersion of oxides of R1 and/or R2 to the main component material as solid solution tends to become uneven. Note that, in the present embodiment, the average particle diameter means a volume-reduced cumulative 50% diameter (D50 diameter), which can be measured by a laser diffraction method, etc. using light scattering.

As the subcomponent materials to be brought to react with the main component material in advance, the oxides of R1 or R2 as above and a variety of compounds to be the oxides of R1 or R2 when fired may be used. For example, a part of the oxides of R1 may be brought to react in advance, a part of the oxides of R2 may be brought to react in advance, or a part of the oxides of R1 and a part of the oxides of R2 may be brought to react in advance. As the oxides of R1 or R2 and the compounds to be the oxides of R1 or R2 when fired, powder materials having an average particle diameter of 0.01 to 0.1 μm or so or sol materials mentioned below, etc. may be used.

The sol materials are not particularly limited and, for example, hydroxide sol and oxide sol, etc. may be mentioned. Also, a sol particle diameter of the sol materials is normally 1 to 100 nm or so, and as the solvent, water; methanol, ethanol and other alcohols; xylene, toluene and other aromatic solvents; methylethylketone and other ketones; and other organic based solvents may be mentioned.

The compounds to be the oxides of R1 or R2 when fired are not particularly limited, and alkoxide of R1 or R2 and inorganic acid salts of R1 or R2, etc. may be mentioned. Alkoxide of R1 or R2 is not particularly limited and, for example, $CH_3OM$, $C_2H_5OM$, $n-C_3H_7OM$, $i-C_3H_7OM$ (M is R1 or R2), etc. may be mentioned. Also, inorganic acid salts of R1 or R2 are not particularly limited and, for example, chlorides, nitrates, phosphates, sulfates, etc. may be mentioned.

The fourth subcomponent material and/or the fifth subcomponent material to be brought to react with the main component material in advance is preferably 0 to 0.5 mole (note that 0 and 0.5 are not included), and more preferably 0 to 0.4 mole, and furthermore preferably 0 to 0.25 mole when calculated as a conversion of R1 and/or R2 with respect to 100 moles of the main component.

When an amount of the fourth subcomponent material and/or fifth subcomponent material to be brought to react with the main component in advance is too much, a crystal grain diameter of a sintered body to be obtained after firing becomes too large and it is liable that a temperature characteristic of the capacitance declines and the IR declines.

As a method of obtaining the post-reaction material by bringing the main component material reacting with a part of the fourth subcomponent material and/or a part of the fifth subcomponent material in advance, a method of mixing the main component material and the subcomponent materials by using a solvent, etc., evaporating the solvent and performing preliminary firing and a method of adding a precipitant to a mixed solution, depositing the subcomponents on the main component and performing preliminary firing, etc. may be mentioned. Note that a temperature at the preliminary firing is preferably 500 to 700° C. or so.

Next, by adding the remaining fourth subcomponent material and fifth subcomponent material (remaining materials of the fourth subcomponent and fifth subcomponent for composing the dielectric ceramic composition) and the first to third and sixth subcomponent materials to the obtained post-reaction material and, then, mixing and, performing preliminary firing if necessary, so that a dielectric ceramic composition powder is obtained. As the remaining fourth subcomponent material, fifth subcomponent material and the first to third and sixth subcomponent materials, the above oxides, mixture of them, composite oxides, and a variety of compounds to be the oxides and composite oxides when fired may be used.

Next, the thus obtained dielectric ceramic composition powder is used to produce dielectric layer paste. The dielectric layer paste may be organic based slurry obtained by kneading the dielectric ceramic composition powder and an organic vehicle, or water-based slurry.

An organic vehicle is obtained by dissolving a binder in an organic solvent. The binder to be used for the organic vehicle is not particularly limited and may be suitably selected from a variety of normal binders, such as ethyl cellulose and polyvinyl butyral, etc. Also, the organic solvent to be used is not particularly limited and may be suitably selected from a variety of organic solvents, such as terpineol, butyl carbitol, acetone, and toluene, etc., in accordance with a method to be used, such as the printing method and sheet method.

Also, when using water-based slurry as a dielectric layer paste, a water-based vehicle obtained by dissolving a water-soluble binder and dispersant, etc, in water may be kneaded with a dielectric material. The water-soluble binder used for the water based vehicle is not particularly limited and, for example, polyvinyl alcohol, cellulose and water-soluble acrylic resin, etc. may be used.

The internal electrode layer paste is fabricated by kneading a conductive material formed by the above variety of conductive metals and alloys or a variety of oxides, organic metal compounds, and resinates, etc., which become the above conductive materials after firing, with the above organic vehicle.

The external electrode paste may be fabricated in the same way as the above internal electrode layer paste.

A content of the organic vehicle in the above variety of paste is not particularly limited and may be a normal content, for example, the binder may be 1 to 5 wt % or so and the solvent may be 10 to 50 wt % or so. Also, additives selected from a variety of dispersants, plasticizers, dielectrics and insulators, etc. may be included in each paste if necessary. A total content thereof is preferably 10 wt % or smaller.

When using the printing method, the dielectric layer paste and the internal electrode layer paste are stacked by printing on a substrate, such as PET, cut into a predetermined shape and removed from the substrate to obtain a green chip.

When using the sheet method, the dielectric layer paste is used to form a green sheet, the internal electrode layer paste is printed thereon and, then, the results are stacked to obtain green multilayer body and cut into a predetermined size so as to obtain a green chip.

Before firing, binder removal processing is performed on the green chip. As a binder removal condition, the temperature rising rate is preferably 5 to 300° C./hour and more preferably 10 to 100° C./hour, the holding temperature is preferably 180 to 400° C. and more preferably 200 to 300° C., and the temperature holding time is preferably 0.5 to 24 hours and more preferably 5 to 20 hours. The atmosphere at binder removal is preferably in the air.

Next, the green chip subjected to the binder removal processing is fired. An atmosphere at firing the green chip may be suitably determined in accordance with a kind of a conductive material in the internal electrode layer paste, but when using a base metal, such as Ni or a Ni alloy, as the conductive material, an oxygen partial pressure in the firing atmosphere is preferably $10^{-14}$ to $10^{-9}$ atm. When the oxygen partial pressure is lower than the above range, the conductive material in the internal electrode layer results in abnormal sintering to be broken in some cases. While, when the oxygen partial pressure exceeds the above range, the internal electrode layer tends to be oxidized.

Also, the holding temperature at firing is preferably 1000 to 1400° C., and more preferably 1100 to 1350° C. When the holding temperature is lower than the above range, densification becomes insufficient, while when exceeding the above range, breakings of electrodes due to abnormal sintering of the internal electrode layer, deterioration of capacity-temperature characteristics due to dispersion of the internal electrode layer component, and reduction of the dielectric ceramic composition are easily caused.

As other firing condition, the temperature raising rate is preferably 100 to 900° C./hour and more preferably 200 to 900° C./hour, the temperature holding time is preferably 0.5 to 9 hours and more preferably 1 to 3 hours, and the cooling rate is preferably 50 to 500° C./hour and more preferably 200 to 300° C./hour. The firing atmosphere is preferably a reducing atmosphere and a preferable atmosphere gas is, for example, a wet mixed gas of $N_2$ and $H_2$.

When firing in a reducing atmosphere, it is preferable that annealing is performed on the capacitor element body. Annealing is processing for re-oxidizing the dielectric layer and the IR lifetime is remarkably elongated thereby, so that the reliability is improved.

An oxygen partial pressure in the annealing atmosphere is preferably $10^{-6}$ atm or higher, and particularly preferably $10^{-7}$ to $10^{-4}$ atm. When the oxygen partial pressure is lower than the above range, re-oxidization of the dielectric layer becomes difficult, while when exceeding the above range, the internal electrode layer tends to be oxidized.

The holding temperature at annealing is preferably 1200° C. or lower, and particularly preferably 500 to 1200° C. When the holding temperature is lower than the above range, oxidization of the dielectric layer becomes insufficient, so that the IR becomes low and the IR accelerated lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristics, a decline of the IR and a decline of the IR accelerated lifetime are easily caused.

As other annealing condition, the temperature raising rate is preferably 100 to 900° C./hour and more preferably 200 to 900° C./hour, the temperature holding time is preferably 0.5 to 12 hours and more preferably 1 to 10 hours, and the cooling rate is preferably 50 to 600° C./hour and more preferably 100 to 300° C./hour. Also, a preferable atmosphere gas at annealing is, for example, a wet $N_2$ gas, etc.

In the above binder removal processing, firing and annealing, for example, a wetter, etc. may be used to wet the $N_2$ gas and mixed gas, etc. In that case, the water temperature is preferably 5 to 75° C. or so.

The binder removal processing, firing and annealing may be performed continuously or separately.

End surface polishing, for example, by barrel polishing or sand blast, etc. is performed on the capacitor element body obtained as above, and the external electrode paste is printed or transferred and fired to form external electrodes 4. A firing condition of the external electrode paste is preferably, for example, at 600 to 800° C. in a wet mixed gas of $N_2$ and $H_2$ for 10 minutes to 1 hour or so. A cover layer is formed by plating, etc. on the surface of the external electrodes 4 if necessary.

A multilayer ceramic capacitor of the present invention produced as above is mounted on a print substrate, etc. by soldering, etc. and used for a variety of electronic apparatuses, etc.

An embodiment of the present invention was explained above, but the present invention is not limited to the above embodiment and may be variously modified within the scope of the present invention.

For example, in the above embodiment, a multilayer ceramic capacitor was explained as an example of an electronic device according to the present invention, but an electronic device according to the present invention is not limited to the multilayer ceramic capacitor and may be any as far as it includes a dielectric layer composed of a dielectric ceramic composition having the above composition.

EXAMPLES

Below, the present invention will be explained based on furthermore detailed examples, but the present invention is not limited to the examples.

Example 1

First, as a main component material, a $BaTiO_3$ powder having an average particle diameter of 0.30 μm was prepared, and as a material to be brought to react in advance (pre-added material), a $Y_2O_3$ powder of the fourth subcomponent was prepared. Next, the prepared $BaTiO_3$ powder and a part of the $Y_2O_3$ powder were pulverized by wet mixing by a ball mill to form slurry, and the slurry was dried, preliminarily fired and pulverized to obtain a post-reaction material. Note that the preliminary firing condition was a temperature raising rate of 200° C./hour, a holding temperature of 500° C., a temperature holding time of 2 hours and atmosphere is in the air. A pre-adding quantity of $Y_2O_3$ was 0.02 mole when calculated as a conversion of Y atoms (it will be the same in examples, comparative examples and reference examples below in the specification of the present invention) with respect to 100 moles of the main component. Namely, it was 0.01 mole when calculated as a conversion of $Y_2O_3$.

Next, as materials to be added to the obtained post-reaction material (post-added material), $Y_2O_3$ (the fourth subcomponent) and $Gd_2O_3$ (the fifth subcomponent) were used. An adding quantity of $Y_2O_3$ was 0.58 mole when calculated as a conversion of Y atoms (an adding quantity when calculated as a conversion of $Y_2O_3$ was 0.29 mole), and an adding quantity of $Gd_2O_3$ was 0.06 mole when calculated as a conversion of Gd atoms (an adding quantity when calculated as a conversion of $Gd_2O_3$ was 0.03 mole). Materials of the first to third and sixth subcomponent and adding quantities of the respective subcomponents to be added to the obtained post-reaction material were as below. Namely, MgO (the first subcomponent) was added in an amount of 1.0 mole, (Ba, Ca) $SiO_3$ (the second subcomponent) 0.875 mole, $V_2O_5$ (the third subcomponent) 0.044 mole and MnO (the sixth subcomponent) 0.1 mole. The post-reaction material added with the above subcomponent materials was wet mixed and pulverized by a ball mill to form slurry, and the slurry was dried, preliminarily fired and pulverized, so that a dielectric ceramic composition powder was obtained. Note that adding quantities of the respective subcomponents were quantities calculated as a conversion of respective oxides (note that $Y_2O_3$ was calculated as a conversion of Y atoms, and $Gd_2O_3$ was calculated as a conversion of Gd atoms) with respect to 100 moles of the main component.

Note that, in the example 1, a total quantity of the (pre-added) $Y_2O_3$ to be brought to react in advance and the (post-added) $Y_2O_3$ added to the post-reaction material becomes a quantity of $Y_2O_2$ to be included in the finally obtained dielectric ceramic composition, and the $Gd_2O_3$ added to the post-reaction material becomes a quantity of $Gd_2O_3$ to be included in the finally obtained dielectric ceramic composition. Namely, in the example 1, a ratio M1/M2 of the number of moles M1 of R1 of the fourth subcomponent (pre-added 0.02 mole+post added 0.58 mole=0.6 mole) and the number of moles M2 of R2 of the fifth subcomponent (0.06 mole) in the finally obtained dielectric ceramic composition is 10.

The thus obtained dielectric ceramic composition powder in an amount of 100 parts by weight, an acrylic resin in an amount of 4.8 parts by weight, ethyl acetate in an amount of 100 parts by weight, mineral spirit in an amount of 6 parts by weight and toluene in an amount of 4 parts by weight were mixed by a ball mill to form paste, so that dielectric layer paste was obtained.

Next, Ni particles in an amount of 44.6 parts by weight, terpineol in an amount of 52 parts by weight, ethyl cellulose in an amount of 3 parts by weight, benzotriazole in an amount of 0.4 part by weight were kneaded by a triple-roll to form slurry, so that internal electrode layer paste was obtained.

These pastes were used to produce the multilayer ceramic chip capacitor 1 shown in FIG. 1 as below.

First, the obtained dielectric layer paste was used to form a green sheet on a PET film. After printing the internal electrode paste thereon, the sheet was removed from the PET film. Next, the green sheets and protective green sheets (without the internal electrode layer paste printed thereon) were stacked and bonded by pressure, so that a green multilayer body was obtained. Next, the green multilayer body was cut into a predetermined size to obtain a green chip and subjected to binder removal processing, firing and annealing under the conditions below, so that a multilayer ceramic fired body was obtained.

The binder removal processing condition was a temperature raising rate of 32.5° C./hour, holding temperature of 260° C., the temperature holding time of 8 hours and atmosphere is in the air.

The firing condition was a temperature raising rate of 200° C./hour, holding temperature of 1260 to 1280° C., the temperature holding time of 2 hours, cooling rate of 200° C./hour, and an atmosphere of a wet mixed gas of $N_2+H_2$ (oxygen partial pressure was $10^{-12}$ atm).

The annealing condition was a temperature raising rate of 200° C./hour, holding temperature of 1050° C., the temperature holding time of 2 hours, cooling rate of 200° C./hour, and an atmosphere of a wet $N_2$ gas (oxygen partial pressure was $10^{-5}$ atm). Note that a wetter with a water temperature of 20° C. was used to wet the atmosphere gases at firing and annealing.

Next, end surfaces of the obtained multilayer ceramic fired body were polished by sand blast and, then, an In—Ga alloy was applied as external electrodes, so that samples of multilayer ceramic capacitor as an example 1 shown in FIG. 1 were obtained.

A size of the obtained capacitor samples was 3.2 mm×1.6 mm×0.6 mm, the number of dielectric layers sandwiched by the internal electrode layers was 4, a thickness (interlayer thickness) of one dielectric layer was 3.5 µm, and a thickness of one internal electrode layer was 1.2 µm. Next, on the obtained capacitor samples, an average crystal grain diameter of dielectric particles, specific permittivity ∈, a dielectric loss tan δ, insulation resistance IR, a CR product, a temperature characteristic of capacitance and an IR accelerated lifetime were evaluated by the methods explained below. Also, from the result of conducting an XPS measurement on the post-reaction material obtained by bringing $BaTiO_3$ reacting with $Y_2O_3$, it was confirmed that respective elements of Ba, Ti and Y were uniformly distributed inside particles.

Average Crystal Grain Diameter of Dielectric Particles

A method of measuring an average particle diameter of the dielectric particles was cutting an obtained capacitor sample on a surface perpendicular to internal electrodes first, polishing the cut surface. Then, performing chemical etching or thermal etching on the polished surface, observing by a scanning electron microscope (SEM) and calculating by the code method on an assumption that shapes of the dielectric particles are spheres. The results are shown in Table 1.

Specific Permittivity ∈

On each of the capacitor samples, capacitance C was measured under a condition of a reference temperature of 20° C., using a digital LCR meter (YHP4274A made by Yokogawa Electric Corporation), a frequency of 120 Hz and an input signal level (measurement voltage) of 0.5Vrms/µm. Then, specific permittivity (no unit) was calculated from the obtained capacitance, a dielectric thickness and a superimposing area of internal electrodes in the multilayer ceramic capacitor. The higher the specific permittivity is, the more preferable. The results are shown in Table 1.

Dielectric Loss tan δ

On each of the capacitor samples, a dielectric loss tan δ was measured under a condition of a reference temperature of 20° C., using a digital LCR meter (YHP4274A made by Yokogawa Electric Corporation), a frequency of 120 Hz and an input signal level (measurement voltage) of 0.5Vrms/µm. The smaller the dielectric loss is, the more preferable. The results are shown in Table 1.

Insulation Resistance IR

On each of the capacitor samples, insulation resistance IR was measured by using an insulation resistance tester (R8340A made by Advantest Corporation) after applying a direct current voltage of 4V/µm for one minute at 20° C. The larger the insulation resistance IR is, the more preferable. The results are shown in Table 1.

CR Product

A CR product was measured by obtaining a product of the capacitance C (unit: µF) and insulation resistance IR (unit: MΩ) measured as explained above. The larger the CR product is, the more preferable. The results are shown in Table 1.

Temperature Characteristic of Capacitance

On each of the capacitor samples, capacitance at −55 to 125° C. was measured and a change rate ΔC of the capacitance was calculated to evaluate whether the X7R characteristics of the EIA standard are satisfied or not. Namely, evaluation was made on whether the change rate ΔC was within ±15% or not at −55 to 125° C. The results are shown in Table 1. Note that samples satisfied the X7R characteristics were marked as "good" and those not satisfied were marked as "NG" in Table 1.

IR Accelerated Lifetime

On each of the capacitor samples, an acceleration test was conducted under an electric field of 12V/µm at 180° C., and time (unit: hour) until the insulation resistance IR becomes $10^8$ Ω or lower was calculated. The longer the IR accelerated lifetime is, the more preferable. The results are shown in Table 1.

Examples 2 to 4, Comparative Examples 1 and 2 and Reference Example 1

Other than changing a quantity of $Y_2O_3$ (the fourth subcomponent) to be brought to react with the main component material in advance and a quantity of $Y_2O_3$ (the fourth subcomponent) to be added to the post-reaction material to those shown in Table 1 calculated as a conversion of Y atoms, capacitor samples of examples 2 to 4, comparative examples 1 and 2 and a reference example 1 were obtained in the same way as in the example 1. Namely, in the comparative example 1, $Y_2O_3$ was not brought to react with the main component material in advance, and the main component materials and the first to sixth subcomponent materials were directly mixed. Also, in the comparative example 2, a quantity of $Y_2O_3$ to be brought to react with the main component material in advance was 0.60 mole calculated in a conversion of Y atoms (0.30 mole when calculated in a conversion of $Y_2O_3$) when obtaining a post-reaction material and, the obtained post-reaction material was not added with the fourth subcomponent ($Y_2O_3$) but only added with the first to third, fifth and sixth subcomponents. Namely, in the comparative example 2, not a part but all of the fourth subcomponent was brought to react in advance. On each of the obtained capacitor samples in the examples 2 to 4, comparative examples 1 and 2 and the reference example 1, the same evaluations as those in the example 1 were made. The results are shown in Table 1 atoms (0.30 mole when calculated as a conversion of $Y_2O_3$) and, then, the obtained post-reaction material was not added with $Y_2O_3$, it was confirmed that an average crystal grain diameter of dielectric particles after sintering became as large as 0.48 μm and the dielectric loss, IR, CR product, temperature characteristic of capacitance and IR accelerated lifetime were poor.

Furthermore, the reference example 1, wherein a quantity of $Y_2O_3$ to be brought to react with the main component in advance was 0.50 mole, that is, being out of the preferable range of the present invention when calculated as a conversion of Y atoms, exhibited poor results in the IR, CR product and temperature characteristic of the capacitance.

From the above results, when comparing the examples 1 to 4 with the comparative examples 1 and 2, it was confirmed that by bringing the main component reacting with a part of the fourth subcomponent ($Y_2O_3$) in advance, high specific permittivity and a preferable temperature characteristic of the capacitance could be realized while maintaining other electric characteristics (a dielectric loss tan δ, insulation resis-

TABLE 1

| | Subcomponent | | | | Sintered Body | | | | | | |
|---|---|---|---|---|---|---|---|---|---|---|---|
| | Pre-Added | Post-Added | | | | | | | | | |
| | Fourth (R1) Y [mol] | Fourth (R1) Y [mol] | Fifth (R2) Gd [mol] | Mole Ratio of R1 and R2 M1/M2 | Crystal Grain Diameter [μm] | Specific Permittivity ε | tan δ [%] | IR [Ω·m] | CR Product [μF·MΩ] | X7R Characteristics | IR Lifetime [h] |
| Comparative Example 1 | 0 | 0.60 | 0.06 | 10 | 0.39 | 2650 | 3.9 | 1.0E+11 | 2340 | NG | 6 |
| Example 1 | 0.02 | 0.58 | 0.06 | 10 | 0.37 | 3400 | 7.3 | 1.2E+11 | 3610 | Good | 12 |
| Example 2 | 0.05 | 0.55 | 0.06 | 10 | 0.35 | 4100 | 9.6 | 1.3E+11 | 4790 | Good | 17 |
| Example 3 | 0.10 | 0.50 | 0.06 | 10 | 0.35 | 4300 | 9.7 | 1.5E+11 | 5710 | Good | 25 |
| Example 4 | 0.25 | 0.35 | 0.06 | 10 | 0.34 | 4320 | 10.0 | 1.4E+11 | 5350 | Good | 20 |
| Reference Example 1 | 0.50 | 0.10 | 0.06 | 10 | 0.37 | 3630 | 11.5 | 8.5E+10 | 2730 | NG | 16 |
| Comparative Example 2 | 0.60 | 0 | 0.06 | 10 | 0.48 | 5200 | 15.2 | 8.8E+09 | 405 | NG | 6 |

With respect to 100 moles of main component ($BaTiO_3$),
First subcomponent: MgO 1.0 mol
Second subcomponent: (Ba, Ca)$SiO_3$ 0.875 mol
Third subcomponent: $V_2O_5$ 0.044 mol
Sixth subcomponent: MnO 0.1 mol
Average particle diameter of main component material: 0.30 μm
Thickness per one dielectric layer (Interlayer thickness) = 3.5 μm
"mE + n" means "m × $10^{+n}$" in Table.

Evaluation 1

From Table 1, it was confirmed that all of the capacitor samples in the examples 1 to 4, wherein a quantity of the fourth subcomponent ($Y_2O_3$) to be brought to react with the main component in advance was in a preferable range of the present invention when calculated as a conversion of Y atoms and, then, remaining of the fourth subcomponent ($Y_2O_3$) and the fifth subcomponent ($Gd_2O_3$) are added to the obtained post-reaction material, exhibited high specific permittivity, a preferable temperature characteristic of the capacitance and preferable other electric characteristics (a dielectric loss tan δ, insulation resistance IR, a CR product and an IR accelerated lifetime).

On the other hand, the comparative example 1, wherein the main component and $Y_2O_3$ were not brought to react in advance, the specific permittivity became as low as 2650 and it was confirmed to be difficult to attain downsizing and a larger capacity. Note that the comparative example 1 corresponds to samples in an example in the Japanese Unexamined Patent Publication No. 2005-29423.

Also, in the comparative example 2, wherein a quantity of $Y_2O_3$ to be brought to react with the main component in advance was 0.60 mole when calculated as a conversion of Y tance IR, a CR product and an IR accelerated lifetime) preferable. Also, when comparing the examples 1 to 4 with the reference example 1, it was confirmed to be preferable that a quantity of the fourth subcomponent ($Y_2O_3$) was set to be in the preferable range of the present invention explained above when calculated as a conversion of Y atoms when bringing a part of the fourth subcomponent ($Y_2O_3$) reacting with the main component to produce the post-reaction material.

Examples 5 to 8, Comparative Example 3 and Reference Example 2

Other than using $Yb_2O_3$ (the fourth subcomponent) instead of $Y_2O_3$ (the fourth subcomponent) as a material to be brought to react with the main component in advance and changing a quantity of $Yb_2O_3$ (the fourth subcomponent) to be brought to react with the main component in advance and a quantity of $Y_2O_3$ (the fourth subcomponent) to be added to the post-reaction material to those shown in Table 2 calculated as a conversion of R1, capacity samples of the examples 5 to 8, comparative example 3 and reference example 2 were obtained in the same way as in the example 1.

Also, in Table 2, a ratio M1/M2 of the number of moles M1 of R1 of the fourth subcomponent and the number of moles M2 of R2 of the fifth subcomponent in the finally obtained dielectric ceramic composition was 10. On each of the obtained capacitor samples, the same evaluations as those in the example 1 were made. The results are shown in Table 2. Note that an adding quantity of $Yb_2O_3$ was expressed by calculating as a conversion of Yb atoms as in the case of $Y_2O_3$.

to react with the main component in advance and changing a quantity of $Tb_2O_3$ (the fifth subcomponent) to be brought to react with the main component in advance and a quantity of $Y_2O_3$ (the fourth subcomponent) to be added to the post-reaction material to those shown in Table 3 calculated as a conversion of R1 and R2, capacity samples of the examples 9a to 9e and comparative examples 4 and 5 were obtained in the same way as in the example 1.

TABLE 2

| | Subcomponent | | | Sintered Body | | | | | | |
|---|---|---|---|---|---|---|---|---|---|---|
| | Pre-Added | Post-Added | | | | | | | | |
| | Fourth (R1) Yb [mol] | Fourth (R1) Y [mol] | Fifth (R2) Gd [mol] | Mole Ratio of R1 and R2 M1/M2 | Crystal Grain Diameter [μm] | Specific Permit-tivity ε | tan δ [%] | IR [Ω·m] | CR Product [μF·MΩ] | X7R Charac-teristics | IR Lifetime [h] |
| Example 5 | 0.02 | 0.58 | 0.06 | 10 | 0.38 | 3620 | 7.3 | 1.2E+11 | 3850 | Good | 7 |
| Example 6 | 0.05 | 0.55 | 0.06 | 10 | 0.36 | 4350 | 9.6 | 1.3E+11 | 5000 | Good | 14 |
| Example 7 | 0.10 | 0.50 | 0.06 | 10 | 0.35 | 4210 | 9.7 | 1.5E+11 | 5590 | Good | 14 |
| Example 8 | 0.25 | 0.35 | 0.06 | 10 | 0.35 | 4070 | 10.0 | 1.4E+11 | 5050 | Good | 21 |
| Reference Example 2 | 0.50 | 0.10 | 0.06 | 10 | 0.35 | 3760 | 11.5 | 8.5E+10 | 2830 | NG | 10 |
| Comparative Example 3 | 0.60 | 0 | 0.06 | 10 | 0.52 | 4820 | 16.2 | 7.9E+09 | 340 | NG | 3 |

With respect to 100 moles of main component ($BaTiO_3$),
First subcomponent: MgO 1.0 mol
Second subcomponent: (Ba, Ca)$SiO_3$ 0.875 mol
Third subcomponent: $V_2O_5$ 0.044 mol
Sixth subcomponent: MnO 0.1 mol
Average particle diameter of main component material: 0.30 μm
Thickness per one dielectric layer (Interlayer thickness) = 3.5 μm
"mE + n" means "m × 10$^{+n}$" in Table.

Evaluation 2

From Table 2, it was confirmed that the same tendency was exhibited also in the case of using $Yb_2O_3$ (the fourth subcomponent) instead of $Y_2O_3$ (the fourth subcomponent) as a material to be brought to react with the main component in advance.

Examples 9a to 9e and Comparative Examples 4 and 5

Other than using $Tb_2O_3$ (the fifth subcomponent) instead of $Y_2O_3$ (the fourth subcomponent) as a material to be brought Also, in Table 3, a ratio M1/M2 of the number of moles M1 of R1 of the fourth subcomponent and the number of moles M2 of R2 of the fifth subcomponent in the finally obtained dielectric ceramic composition was in a range of the present invention in the examples 9a to 9e and out of the range of the present invention in the comparative examples 4 and 5. On each of the obtained capacitor samples, the same evaluations as those in the example 1 were made. The results are shown in Table 3. Note that an adding quantity of $Tb_2O_3$ was expressed by calculating as a conversion of Tb atoms as in the case of $Y_2O_3$.

TABLE 3

| | Subcomponent | | | Sintered Body | | | | | | |
|---|---|---|---|---|---|---|---|---|---|---|
| | Pre-Added | Post-Added | | | | | | | | |
| | Fifth (R2) Tb [mol] | Fourth (R1) Y [mol] | Fifth (R2) Gd [mol] | Mole Ratio of R1 and R2 M1/M2 | Crystal Grain Diameter [μm] | Specific Permit-tivity ε | tan δ [%] | IR [Ω·m] | CR Product [μF·MΩ] | X7R Charac-teristics | IR Lifetime [h] |
| Example 9a | 0.02 | 1.5 | 0.02 | 37.5 | 0.31 | 3900 | 6.9 | 1.3E+11 | 4490 | Good | 92 |
| Example 9b | 0.02 | 1 | 0.02 | 25 | 0.32 | 4330 | 7.4 | 1.2E+11 | 4600 | Good | 53 |
| Example 9c | 0.02 | 0.58 | 0.02 | 14.5 | 0.34 | 4750 | 8.3 | 1.4E+11 | 5880 | Good | 12 |
| Example 9d | 0.02 | 0.58 | 0.06 | 7.3 | 0.35 | 4600 | 8.4 | 1.4E+11 | 5700 | Good | 13 |
| Example 9e | 0.05 | 0.55 | 0.06 | 5.0 | 0.36 | 4250 | 10.0 | 1.4E+11 | 5270 | Good | 15 |
| Comparative Example 4 | 0.50 | 0.10 | 0.06 | 0.2 | 0.34 | 4500 | 11.2 | 8.9E+10 | 3540 | NG | 12 |

TABLE 3-continued

| | Subcomponent | | | Sintered Body | | | | | | |
|---|---|---|---|---|---|---|---|---|---|---|
| | Pre-Added | Post-Added | | | | | | | | |
| | Fifth (R2) Tb [mol] | Fourth (R1) Y [mol] | Fifth (R2) Gd [mol] | Mole Ratio of R1 and R2 M1/M2 | Crystal Grain Diameter [μm] | Specific Permittivity ε | tan δ [%] | IR [Ω · m] | CR Product [μF · MΩ] | X7R Characteristics | IR Lifetime [h] |
| Comparative Example 5 | 0.60 | 0 | 0.06 | 0 | 0.57 | 5200 | 17.0 | 8.0E+10 | 3680 | NG | 8 |

With respect to 100 moles of main component ($BaTiO_3$),
First subcomponent: MgO 1.0 mol
Second subcomponent: (Ba, Ca)$SiO_3$ 0.875 mol
Third subcomponent: $V_2O_5$ 0.044 mol
Sixth subcomponent: MnO 0.1 mol
Average particle diameter of main component material: 0.30 μm
Thickness per one dielectric layer (Interlayer thickness) = 3.5 μm
"mE + n" means "m × $10^{+n}$" in Table.

Evaluation 3

From Table 3, the following is confirmed. Namely, it was confirmed that the same tendency was exhibited also in the case of using $Tb_2O_3$ (the fifth subcomponent) instead of $Y_2O_3$ (the fourth subcomponent) as a material to be brought to react with the main component in advance.

Examples 13 to 15

Other than using $Dy_2O_3$ (example 13), $Tb_2O_3$ (example 14) and $Eu_2O_3$ (example 15) instead of $Gd_2O_3$ as the fifth subcomponent material to be added to the post-reaction material and changing quantities of them to those shown in Table 4 calculated as a conversion of R2, capacitor samples of the examples 13 to 15 were obtained in the same way as in the example 2. In all of the examples 13 to 15, $Y_2O_3$ (the fourth subcomponent) was used as a sub component to be brought to react with the main component in advance.

Also, in Table 4, a ratio M1/M2 of the number of moles M1 of R1 of the fourth subcomponent and the number of moles M2 of R2 of the fifth subcomponent in the finally obtained dielectric ceramic composition was 10. On each of the obtained capacitor samples, the same evaluations as those in the example 1 were made. The results are shown in Table 4. Note that quantities of $Gd_2O_3$, $Dy_2O_3$, $Tb_2O_3$ and $Eu_2O_3$ were expressed by calculating as conversions of respective atoms.

Evaluation 4

From Table 4, even when using the above rare earth oxides instead of $Gd_2O_3$ as the fifth subcomponent material to be added to the post-reaction material, the same results as in the case of $Gd_2O_3$ were obtained.

Examples 16 to 19 and Comparative Examples 6 to 9

In the present examples, the effects of the present invention were examined in the case where the fifth subcomponent was included in the finally obtained dielectric ceramic composition. Also, the effects of the present invention when changing an average particle diameter of the main component material and adding quantities of the respective subcomponents were examined.

Namely, in the examples 16 to 19, $Y_2O_3$ (the fourth subcomponent) was used as a material to be brought to react with the main component material, and $Y_2O_3$ (the fourth subcomponent) and $Eu_2O_3$ (the fifth subcomponent) were used as materials to be added to the post-reaction material. Also, in the comparative examples 6 to 9, $Y_2O_3$ (the fourth subcomponent) was used as a material to be added to the post-reaction material. Adding quantities of the fourth subcomponent and the fifth subcomponent were those shown in Table 5 calculated as conversions of R1 and R2.

TABLE 4

| | Subcomponent | | | | Sintered Body | | | | | | |
|---|---|---|---|---|---|---|---|---|---|---|---|
| | Pre-Added | Post-Added | | | | | | | | | |
| | Fourth (R1) Y [mol] | Fourth (R1) Y [mol] | Fifth (R2) R2 [mol] | Mole Ratio of R1 and R2 M1/M2 | Crystal Grain Diameter [μm] | Specific Permittivity ε | tan δ [%] | IR [Ω · m] | CR Product [μF · MΩ] | X7R Characteristics | IR Lifetime [h] |
| Example 2 | 0.05 | 0.55 | Gd: 0.06 | 10 | 0.35 | 4100 | 9.6 | 1.3E+11 | 4790 | Good | 17 |
| Example 13 | 0.05 | 0.55 | Dy: 0.06 | 10 | 0.36 | 4050 | 9.4 | 1.4E+11 | 5020 | Good | 15 |
| Example 14 | 0.05 | 0.55 | Tb: 0.06 | 10 | 0.34 | 4180 | 9.7 | 1.5E+11 | 5550 | Good | 18 |
| Example 15 | 0.05 | 0.55 | Eu: 0.06 | 10 | 0.35 | 4200 | 9.5 | 1.3E+11 | 4830 | Good | 17 |

With respect to 100 moles of main component ($BaTiO_3$),
First subcomponent: MgO 1.0 mol
Second subcomponent: (Ba, Ca)$SiO_3$ 0.875 mol
Third subcomponent: $V_2O_5$ 0.044 mol
Sixth subcomponent: MnO 0.1 mol
Average particle diameter of main component material: 0.30 μm
Thickness per one dielectric layer (interlayer thickness) = 3.5 μm
"mE + n" means "m × $10^{+n}$" in Table.

Note that $BaTiO_3$ having an average particle diameter of 0.35 μm was used as the main component material, and adding quantities of the first to third and sixth subcomponents were as below. Namely, MgO (the first subcomponent) was in an amount of 1.2 moles, (Ba, Ca)$SiO_3$ (the second subcomponent) 0.875 mole, $V_2O_5$ (the third subcomponent) 0.033 mole and MnO (the sixth subcomponent) 0.1 mole.

By using the above main component and the first to sixth subcomponent materials, performing the same processing as in the example 1 and producing dielectric ceramic composition powders, capacitor samples of the examples 16 to 19 and comparative examples 6 to 9 were obtained.

In Table 5, a ratio M1/M2 of the number of moles M1 of R1 of the fourth subcomponent and the number of moles M2 of R2 of the fifth subcomponent in the finally obtained dielectric ceramic composition was 13.3. On each of the obtained capacitor samples, the same evaluations as in the example 1 were made. The results are shown in Table 5.

number of moles M2 of R2 of the fifth subcomponent by changing contents of the fourth subcomponent and fifth subcomponent in the finally obtained dielectric ceramic composition. Also, the effects of the present invention were examined when changing adding quantities of the respective subcomponents.

Namely, $Y_2O_3$ (the fourth subcomponent) was used as a material to be brought to react with the main component material in advance and $Y_2O_3$ (the fourth subcomponent) and $Gd_2O_3$ (the fifth subcomponent) were used as materials to be added to the post-reaction material. Adding quantities of the fourth subcomponent and the fifth subcomponent were those shown in Table 6 calculated as conversions of R1 and R2. The ratio M1/M2 of the number of moles M1 of R1 of the fourth subcomponent and the number of moles M2 of R2 of the fifth subcomponent in the finally obtained dielectric ceramic composition was out of the range of the present invention in the

TABLE 5

| | Subcomponent | | | | Sintered Body | | | | | | |
|---|---|---|---|---|---|---|---|---|---|---|---|
| | Pre-Added | Post-Added | | | | | | | | | |
| | Fourth (R1) Y [mol] | Fourth (R1) Y [mol] | Fifth (R2) Eu [mol] | Mole Ratio of R1 and R2 M1/M2 | Crystal Grain Diameter [μm] | Specific Permittivity ε | tan δ [%] | IR [Ω·m] | CR Product [μF·MΩ] | X7R Characteristics | IR Lifetime [h] |
| Example 16 | 0.04 | 0.76 | 0.06 | 13.3 | 0.31 | 4050 | 6.7 | 1.1E+11 | 3940 | Good | 2.5 |
| Comparative Example 6 | 0.04 | 0.76 | 0 | — | 0.30 | 4000 | 6.8 | 1.2E+11 | 4250 | Good | 1.1 |
| Example 17 | 0.10 | 0.70 | 0.06 | 13.3 | 0.31 | 4900 | 8.0 | 1.3E+11 | 5640 | Good | 3.8 |
| Comparative Example 7 | 0.10 | 0.70 | 0 | — | 0.31 | 4800 | 8.2 | 1.2E+11 | 5270 | Good | 1.6 |
| Example 18 | 0.20 | 0.60 | 0.06 | 13.3 | 0.32 | 4950 | 11.7 | 1.3E+11 | 5700 | Good | 1.8 |
| Comparative Example 8 | 0.20 | 0.60 | 0 | — | 0.31 | 4928 | 11.7 | 1.2E+11 | 5240 | Good | 0.8 |
| Example 19 | 0.30 | 0.50 | 0.06 | 13.3 | 0.34 | 4710 | 10.1 | 1.0E+11 | 4710 | Good | 1.0 |
| Comparative Example 9 | 0.30 | 0.50 | 0 | — | 0.35 | 4600 | 10.0 | 1.2E+11 | 4890 | Good | 0.16 |

With respect to 100 moles of main component ($BaTiO_3$),
First subcomponent: MgO 1.2 mol
Second subcomponent: (Ba, Ca)$SiO_3$ 0.875 mol
Third subcomponent: $V_2O_5$ 0.033 mol
Sixth subcomponent: MnO 0.1 mol
Average particle diameter of main component material: 0.35 μm
Thickness per one dielectric layer (interlayer thickness) = 3.5 μm
"mE + n" means "m × $10^{+n}$" in Table.

Evaluation 5

From Table 5, the followings can be confirmed. Namely, when respectively comparing the examples 16 to 19 with the comparative examples 6 to 9, it is confirmed that the specific permittivity and IR accelerated lifetime decline when the fifth subcomponent is not included in the finally obtained dielectric ceramic composition. Also, from the examples 16 to 19, it is confirmed that preferable results can be obtained even when the average particle diameter of the main component material are changed and the subcomponent compositions are changed.

Examples 20 to 24 and Comparative Examples 10 and 11

In the present examples, the effects of the present invention were examined when changing the ratio M1/M2 of the number of moles M1 of R1 of the fourth subcomponent and the comparative examples 10 and 11 and in the range of the present invention in the examples 20 to 24.

Note that adding quantities of the first to third and sixth subcomponents were as below. Namely, MgO (the first subcomponent) was in an amount of 0.75 mole, (Ba, Ca)$SiO_3$ (the second subcomponent) 0.875 mole, $V_2O_5$ (the third subcomponent) 0.074 mole and MnO (the sixth subcomponent) 0.1 mole.

By using the above main component and the first to sixth subcomponent materials, performing the same processing as in the example 1 and producing dielectric ceramic composition powders, capacitor samples of the examples 20 to 24 and comparative examples 10 and 11 were obtained. On each of the obtained capacitor samples, the same evaluations as in the example 1 were made. The results are shown in Table 6.

TABLE 6

| | Subcomponent | | | | Sintered Body | | | | | | |
|---|---|---|---|---|---|---|---|---|---|---|---|
| | Pre-Added | Post-Added | | | | | | | | | |
| | Fourth (R1) Y [mol] | Fourth (R1) Y [mol] | Fifth (R2) Gd [mol] | Mole Ratio of R1 and R2 M1/M2 | Crystal Grain Diameter [μm] | Specific Permittivity ε | tan δ [%] | IR [Ω·m] | CR Product [μF·MΩ] | X7R Characteristics | IR Lifetime [h] |
| Comparative Example 10 | 0.05 | 0.55 | 0 | — | 0.35 | 3350 | 6.5 | 6.2E+10 | 1840 | Good | 52 |
| Comparative Example 11 | 0.05 | 0.55 | 0.21 | 2.9 | 0.32 | 3370 | 6.2 | 6.1E+10 | 1820 | Good | 74 |
| Example 20 | 0.05 | 0.55 | 0.14 | 4.3 | 0.33 | 3560 | 7.0 | 6.4E+10 | 2020 | Good | 129 |
| Example 21 | 0.05 | 0.55 | 0.07 | 8.6 | 0.35 | 3600 | 6.9 | 6.3E+10 | 2000 | Good | 110 |
| Example 22 | 0.05 | 0.55 | 0.035 | 17.1 | 0.34 | 3490 | 6.6 | 6.3E+10 | 1950 | Good | 85 |
| Example 23 | 0.05 | 1.00 | 0.035 | 30 | 0.29 | 3350 | 5.1 | 6.1E+10 | 1810 | Good | 153 |
| Example 24 | 0.05 | 2.00 | 0.035 | 58.6 | 0.26 | 2920 | 3.8 | 6.0E+10 | 1550 | Good | 242 |

With respect to 100 moles of main component ($BaTiO_3$),
First subcomponent: MgO 0.75 mol
Second subcomponent: (Ba, Ca)$SiO_3$ 0.875 mol
Third subcomponent: $V_2O_5$ 0.074 mol
Sixth subcomponent: MnO 0.1 mol
Average particle diameter of main component material: 0.30 μm
Thickness per one dielectric layer (interlayer thickness) = 3.5 μm
"mE + n" means "m × 10$^{+n}$" in Table.

Evaluation 6

From Table 6, the followings can be confirmed. Namely, when comparing the examples 20 to 24 with the comparative examples 10 and 11, it is confirmed that when the ratio M1/M2 of the number of moles M1 of R1 of the fourth subcomponent and the number of moles M2 of R2 of the fifth subcomponent in the finally obtained dielectric ceramic composition is out of the range of the present invention, high specific permittivity and a preferable IR accelerated lifetime cannot be realized. Also, from the examples 20 to 24, it was confirmed that even when changing the subcomponent compositions, preferable results can be obtained.

What is claimed is:

1. A production method of a dielectric ceramic composition, comprising
a main component comprised of barium titanate,
a fourth subcomponent comprised of an oxide of R1, where R1 is at least one selected from the group consisting of Y, Ho, Er, Tm, Yb and Lu; and
a fifth subcomponent comprised of an oxide of R2, where R2 is at least one selected from the group consisting of Dy, Tb, Gd and Eu;
comprising the steps of
obtaining a post-reaction material by making a material of said main component react with a part of a material of said fourth subcomponent and/or a part of a material of said fifth subcomponent to be included in said dielectric ceramic composition; and
adding remaining materials of said fourth subcomponent and said fifth subcomponent to be included in said dielectric ceramic composition to said post-reaction material;
wherein a ratio M1/M2 of the number of moles M1 of R1 of said fourth subcomponent to the number of moles M2 of R2 of said fifth subcomponent in said finally obtained dielectric ceramic composition satisfies 4<M1/M2≦100, and
in said step for obtaining the post-reaction material, said fourth subcomponent and/or said fifth subcomponent made to react with a material of said main component is more than 0 to less than 0.5 mole when calculated as a conversion of R1 and/or R2 with respect to 100 moles of said main component.

2. The production method of a dielectric ceramic composition as set forth in claim 1, wherein in said step for obtaining the post-reaction material, the material of said main component and the part of the material of said fourth subcomponent and/or the part of the material of said fifth subcomponent to be included in said dielectric ceramic composition are dispersed as solid solution.

3. The production method of a dielectric ceramic composition as set forth in claim 1, wherein
a content of said fourth subcomponent in the finally obtained dielectric ceramic composition with respect to 100 moles of said main component is more than 0 to 10 moles when calculated as a conversion of R1, and
a content of said fifth subcomponent in the finally obtained dielectric ceramic composition with respect to 100 moles of said main component is more than 0 to 2 moles when calculated as a conversion of R2.

4. The production method of a dielectric ceramic composition as set forth in claim 1, wherein, when assuming that a value of effective ionic radius for coordination number 9 of said R1 is r1 and a value of effective ionic radius for coordination number 9 of said R2 is r2, said R1 and said R2 are selected so that a ratio (r2/r1) of r1 and r2 satisfies a relationship of 1.007<r2/r1<1.06.

5. The production method of a dielectric ceramic composition as set forth in claim 1, wherein
said dielectric ceramic composition furthermore comprises
a first subcomponent comprised of at least one selected from the group consisting of MgO, CaO, BaO and SrO,
a second subcomponent comprised of $SiO_2$ mainly and comprised of at least one kind selected from the group consisting of MgO, CaO, BaO, SrO, $Li_2O$ and $B_2O_3$, and
a third subcomponent comprised of at least one selected from the group consisting of $V_2O_5$, $MoO_3$ and $WO_3$;

wherein ratios of respective subcomponents with respect to 100 moles of said main component are
first subcomponent: 0.1 to 5 moles,
second subcomponent: 0.1 to 12 moles, and
third subcomponent: more than 0 to 0.3 mole.

6. The production method of a dielectric ceramic composition as set forth in claim 5, wherein
said dielectric ceramic composition furthermore comprises a sixth subcomponent comprised of MnO and/or $Cr_2O_3$, and
a ratio of the sixth subcomponent with respect to 100 moles of said main component is 0.05 to 1.0 mole.

7. The production method of a dielectric ceramic composition as set forth in claim 1, wherein a material having an average particle diameter of 0.05 to 0.5 μm is used as a material of said main component.

* * * * *